Figure 2:
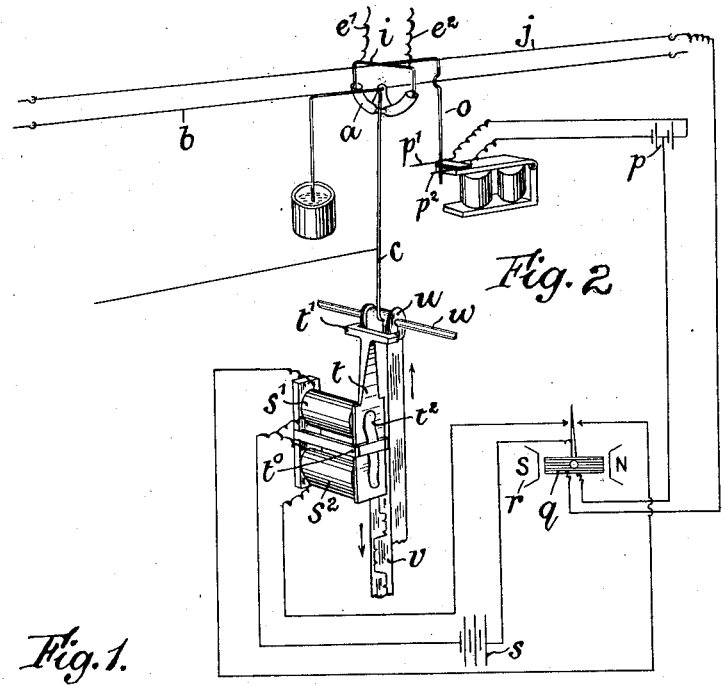

A. ORLING.
ELECTROCAPILLARY INSTRUMENT FOR DETECTING AND RECORDING THE PASSAGE OF ELECTRIC IMPULSES.
APPLICATION FILED DEC. 29, 1908.

1,037,972.

Patented Sept. 10, 1912.

WITNESSES

INVENTOR
Axel Orling

UNITED STATES PATENT OFFICE.

AXEL ORLING, OF TOOTING, ENGLAND, ASSIGNOR TO ORLING'S TELEGRAPH INSTRUMENTS SYNDICATE LIMITED, OF LONDON, ENGLAND.

ELECTROCAPILLARY INSTRUMENT FOR DETECTING AND RECORDING THE PASSAGE OF ELECTRIC IMPULSES.

1,037,972.                 Specification of Letters Patent.       Patented Sept. 10, 1912.

Application filed December 29, 1908. Serial No. 469,821.

*To all whom it may concern:*

Be it known that I, AXEL ORLING, subject of King of Sweden, residing at 64 Links road, Tooting, England, have invented new and useful Improvements in Electrocapillary Instruments for Detecting and Recording the Passage of Electric Impulses, of which the following is a specification.

This invention relates to improvements in contrivances for detecting and recording the passage of electric impulses.

In the specification of my Patent No. 872,193 is described how the passage of an electric impulse through the contacting surfaces of a plug of mercury and another immiscible electro-conductive liquid contained in a constricted tube such as dilute sulfuric acid, is manifested by the displacement of the liquids, causing the vibration of a freely suspended oscillating member which is brought into contact with the extremity of the plug of mercury which is exposed to the atmosphere, the exposed end of the mercury plug being in that patent surrounded by a tube of relatively small bore. In such an instrument it is found that the cohesion between the surface of the tube and the mercury at the portion of its exposed surface close to the surface of the tube, damps the movement of the liquid plug and that, if the tube, at the portion which surrounds the exposed mercury surface, is enlarged in diameter, the excursion of the surface of contact of the two immiscible liquids, on the passage of an electric impulse of given electromotive force, is very greatly increased, but, on the other hand, an undue enlargement of the bore tends to lessen the change of level of the surface, on which change of level the displacement of the oscillating member depends. Yet, as in a mercurial barometer, although the surface is flatter with a falling pressure than with a rising one, the atmospheric pressure is in either case measured by the height of the highest point at the center of the tube, so, in the electro-capillary device, by enlarging the bore sufficiently at the exposed end of the mercury to prevent cohesion from largely affecting the center of the exposed end of the plug, the amplitude of movement of both ends of the plug will be increased.

From the above will be understood the principle on which the chief feature of the present invention is founded, which may be described as the provision of means for minimizing or entirely eliminating in electrocapillary apparatus the resistance of displacement of the contacting surfaces of the immiscible liquids which is, or may be, due to the displacement of the surface of the mercury exposed to the atmosphere.

The effect of the passage of an electric impulse from the mercury to the sulfuric acid being the displacement of the mercury, relatively to the constricted tube, farther into the constriction, on account of the temporary reduction of the surface tension of the mercury and momentary relaxation of the pressure of the mercury on the sides of the constricted passage, the force thus created may be utilized to displace the tube, if such tube is freely suspended, and thus the tube itself will become the oscillating member and by its displacement manifest the passage of the impulse. A tube thus suspended and carrying the scribing element of a siphon recorder may be employed alternatively to the contrivance described in my above numbered patent, apart from the other improvements comprised in the present invention. Alternatively, the tube may be freely suspended as well as a second oscillating member which contacts with the exposed end of the mercury, and thereby, from the duplicated oscillating members, not only can the scribing element of the siphon-recorder be caused to vibrate but also the paper strip on which the record is being inscribed in a manner and for a purpose which will be described with reference to the accompanying drawings.

Figure 1:
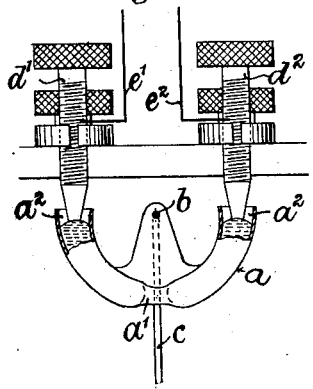

In these drawings:—Figure 1 is an elevation, partly in section, showing an electrocapillary contrivance in which the constricted tube is freely suspended and the liquid contained therein constrained from movement. Fig. 2 shows an electro-capillary recording contrivance in which a suspended tube carries the scribing element of a siphon recorder and an additional oscillating member actuated by the movement of the liquid is independently suspended and by two relays interposed in series effects the displacement of the inscribed record.

Referring first to Fig. 1, $a$ is a tube of semicircular form having a constriction at $a^1$ occupied by an electro-conductive liquid immiscible with mercury, such as dilute sulfuric acid. The tube is suspended from a stretched core or wire $b$ which is at the center of the circle to the shape of which the tube is bent. To the tube is secured the scribing element $c$ of a siphon recorder. $d^1$ and $d^2$ are adjustable blunt-ended stops adapted to be screwed into contact with the surfaces of the mercury contained in the limbs of the tube $a$, leads $e^1$ and $e^2$ connecting the stops with the two branches of the circuit which is traversed by the electric impulses to be recorded, one of which branches may be the earth.

On the passage of an electric impulse from say $d^1$ to $d^2$ through the liquid plugs the surface tension of the mercury in the left-hand limb at the constriction will be momentarily relaxed and the pressure on the tube from left to right at the constriction will be diminished. At the same time the pressure of the mercury in the right hand limb on the surface of the constricted neck will be increased, in consequence of which the mercury will tend to move from left to right and the tube from right to left. Over and above that due to its inertia the actual displacement of the position of the mercury will be opposed by the stops $d^1$ $d^2$ which will constrain the mercury to remain at rest or nearly so and thus the tube $a$ will be angularly displaced from right to left. The ends $a^2$ $a^2$ of the tube $a$ are somewhat enlarged as shown for the purpose of diminishing the resistance to the displacement of the tube $a$ due to cohesion at the exposed ends of the mercury.

Referring next to Fig. 2, an arrangement will be described in which a pair of oscillating members are employed to produce a record. One oscillating member consists of an electro-capillary tube $a$, such as is shown separately in Fig. 1, suspended on a stretched cord or wire $b$ and carrying the scribing element $c$ of a siphon recorder. Contacting with the mercury contained in the tube $a$ is an oscillating member $i$ suspended on a cord or wire $j$. This member $i$ carries a conducting rod $o$ which vibrates between the terminals $p^1$ $p^2$ of a divided relay battery $p$, the electric connections being such that, when contact of $o$ with $p^1$ occurs, the current flows from the battery through a suspended coil $q$ in one direction and, when the contact is made with $p^2$, the current flows through the coil in the opposite direction. The coil $q$ being suspended between the poles of a magnet $r$, the coil will be deflected to one side or the other and complete a circuit from a second, more powerful relay battery $s$ through one or the other of the coils of a pair of electro-magnets $s^1$ $s^2$ and thereby attract an armature $t$ in one direction or the other about its pivot $t^0$ situated midway between the poles of the magnets $s^1$ $s^2$. A prolongation of the armature is provided with a fork $t^1$ which embraces the outside of the flanges of a reel $u$ around which is conveyed the strip of paper $v$ on which the record is being inscribed. The reel is so mounted as to be ready to undergo displacement by the armature. For simplicity it is shown as adapted to slide along a fixed rod $w$. A spring $t^2$ is provided to center the armature and the strip of paper when neither of the electro-magnets $s^1$ $s^2$ is energized.

The first relay battery $p$ is sufficiently weak to avoid the sticking of the rod to the terminals and to further insure the avoidance the terminals are carried on an electromagnetic trembler. Also to give freedom of movement to the scriber it is connected by a light cord to a trembler.

The contrivance above described is devised for the purpose of obtaining a clearly decipherable record of a succession of mixed positive and negative impulses with the minimum movement of the oscillating members. When impulses are transmitted at a very rapid rate the scriber, the amplitude of whose movement is very limited, will be easily able to indicate a discontinuity in a line which discontinuity would be due to a succession of impulses of like sign and when, after any one of those, an impulse of opposite sign occurs, the paper will be displaced by the energy of the relay and distinctly separate the positive from the negative indications and render the record easily readable.

I claim:

1. In an electro-capillary contrivance for recording electric impulses, an oscillating capillary tube containing mercury in contact with an electrolyte and means for restraining movement of said mercury.

2. In an electro-capillary contrivance for recording electric impulses, a means of suspension and an oscillating capillary tube suspended by said means and curved concentrically with the axis of suspension.

3. In an electro-capillary contrivance for recording electric impulses, a capillary tube containing mercury in contact with an electrolyte, the perimeter of the exposed surface of said mercury away from the contacting surface being of relatively larger perimeter than the internal perimeter of said tube.

4. A contrivance for recording a succession of mixed positive and negative electric impulses, comprising a combination of two independently suspended oscillating members, means for simultaneously actuating said two oscillating members by the same electric impulses, the scriber element of a recorder secured to one oscillating member and means whereby the material on which the record is being inscribed can be vibrated through the medium of the other oscillating member.

5. A contrivance for recording a succession of mixed positive and negative electric impulses comprising a combination of two independently suspended oscillating members, means for simultaneously actuating said two oscillating members by the same electric impulses, the scriber element of a recorder secured to one oscillating member, a contact maker secured to the other oscillating member, a relay source of electricity, positive and negative terminals thereof and means whereby the material on which the record is being inscribed can be vibrated through the medium of the relay.

In testimony whereof I have signed my name to this specification in the presence of two subscribing witnesses.

AXEL ORLING.

Witnesses:
H. D. JAMESON,
B. F. WILLIAMS.

Copies of this patent may be obtained for five cents each, by addressing the "Commissioner of Patents, Washington, D. C."